(12) United States Patent
Lee (10) Patent No.: US 11,285,551 B2
(45) Date of Patent: Mar. 29, 2022

(54) PIPE CUTTING DEVICE CAPABLE OF ADJUSTING MOVING PATH OF CUTTER

(71) Applicant: Pin-Hao Lee, Taichung (TW)

(72) Inventor: Pin-Hao Lee, Taichung (TW)

( * ) Notice: Subject to any disclaimer, the term of this patent is extended or adjusted under 35 U.S.C. 154(b) by 3 days.

(21) Appl. No.: 16/785,665

(22) Filed: Feb. 10, 2020

(65) Prior Publication Data

US 2020/0290137 A1 Sep. 17, 2020

(30) Foreign Application Priority Data

Mar. 12, 2019 (TW) ................................ 108108186

(51) Int. Cl.
| | | |
|---|---|---|
| *B23D 21/08* | (2006.01) | |
| *B23D 35/00* | (2006.01) | |
| *B26D 3/16* | (2006.01) | |
| *B26D 7/26* | (2006.01) | |

(52) U.S. Cl.
CPC .......... *B23D 35/007* (2013.01); *B23D 21/08* (2013.01); *B26D 3/169* (2013.01); *B26D 7/2635* (2013.01)

(58) Field of Classification Search
CPC ........ B23D 21/06; B23D 21/08; B23D 21/10; B23D 35/007; B26D 3/169; B26D 7/2635; B26D 7/265
USPC .................................................. 30/102, 101
See application file for complete search history.

(56) References Cited

U.S. PATENT DOCUMENTS

| | | | | |
|---|---|---|---|---|
| 2,796,663 A | * | 6/1957 | Karnes ................... | B23D 21/08 30/102 |
| 4,177,557 A | * | 12/1979 | Courty ................... | B23D 21/08 30/102 |
| 4,305,205 A | * | 12/1981 | Girala .................... | B23D 21/08 30/101 |
| 4,831,732 A | * | 5/1989 | Garton ................... | B23D 21/08 30/101 |
| 8,573,099 B2 | * | 11/2013 | Huang ................... | B23D 21/08 82/113 |
| 2007/0180701 A1 | * | 8/2007 | Hutt ....................... | B23D 21/08 30/95 |
| 2011/0179649 A1 | * | 7/2011 | Park ........................ | B26D 3/16 30/95 |
| 2018/0194029 A1 | * | 7/2018 | Zhou et al. ............ | B26D 3/169 |
| 2018/0290323 A1 | * | 10/2018 | Xie ........................ | B26B 25/005 |

FOREIGN PATENT DOCUMENTS

GB   2 455 367   *   6/2009   ............. B23D 21/08

* cited by examiner

*Primary Examiner* — Clark F Dexter
(74) *Attorney, Agent, or Firm* — Cheng-Ju Chiang (57) ABSTRACT

A pipe cutting device includes first and second C-shaped half-bodies, a cutter disposed between the first and second C-shaped half-bodies, two wheels, an automatic cutter feeding mechanism, and arc-shaped plate adjustment screws. The automatic cutter feeding mechanism moves the cutter to perform an automatic feeding operation and is in cooperation with the two wheels to cut a pipe. The first and second C-shaped half-bodies include a first screw hole and a second screw hole respectively, the arc-shaped plate adjustment screws are locked into the first screw hole and the second screw hole respectively, to adjust a moving path, toward a location between the two wheels, of the cutter pushed by the automatic cutter feeding mechanism. Therefore, the pipe cutting device can adjust the moving path of the cutter, fine tuning to cut the pipe, and adjusting a pressing force of the cutter.

4 Claims, 12 Drawing Sheets

PIPE CUTTING DEVICE CAPABLE OF ADJUSTING MOVING PATH OF CUTTER

BACKGROUND OF THE INVENTION

1. Field of the Invention

The present invention relates to a pipe cutting device capable of adjusting a moving path of a cutter, more particularly to a pipe cutting device which is able to adjust a moving path of a cutter. It can fine tune to cut a pipe with slightly different outer diameter. In addition, it can adjust a pressing force of the cutter performing automatic feeding operation.

2. Description of the Related Art

The conventional pipe cutting device, using a fixed elastic force, includes a cutter, two wheels and a cutter feeding mechanism (or an elastic mechanism). In use of the conventional pipe cutting device, a pipe is placed between the cutter and the two wheels. Then, the cutter feeding mechanism (or the elastic mechanism) can control the cutter to perform an automatic cutter feeding operation, and then the pipe cutting device can be continuously rotated to gradually cut the pipe off.

In recent years, some pipes, such as brake fluid pipes of cars, are coated with protective films on surfaces thereof upon special requirement, and it slightly increases the outer diameters of the pipes. For example, a turbocharged engine is popular in recent years, and the high temperature of the turbocharged engine causes a temperature of the engine room to rise rapidly, so the brake fluid pipe has to be coated with a layer of enamel on an outer surface thereof for protection. Hence, it slightly increases the outer diameter of the brake fluid pipe from about 4.75 mm to about 5.0 mm.

The cutter feeding mechanism (or the elastic mechanism) of the conventional pipe cutting device has a fixed size which cannot be adjusted. When the cutter feeding mechanism (or the elastic mechanism) is used to control the cutter to perform an automatic feeding operation, the cutter feeding amount and cutter movement paths required for the pipe having the same sizes but made by different materials should also be different. Otherwise, the problems are listed as follows. The cutter fails to cut into the pipe (slides over). The cutter applies excessive force to make the pipe deformed. Moreover, the cutter cannot work because of the slight difference in size of the pipe.

In other words, the main disadvantage of the conventional pipe cutting device, using the fixed elastic force, is that the moving path of the cutter cannot be adjusted.

Therefore, it is necessary to develop a pipe cutting device to solve the above disadvantages.

SUMMARY OF THE INVENTION

An objective of the present invention is to provide a pipe cutting device capable of adjusting a moving path of a cutter, and the pipe cutting device has advantages of adjusting a moving path of a cutter, fine tuning to cut the pipe with a slightly different outer diameter, and adjusting a pressing force of the cutter performing an automatic feeding operation. More particularly, the present invention can solve the problem that, in the conventional pipe cutting device using a fixed elastic force, when the cutter feeding mechanism (or elastic force mechanism) controls the cutter to perform the automatic feeding operation, the cutter feeding amount and the cutter moving path for the pipe having the same size and made by different material should be different. Otherwise, the cutter may fail to cut and become idling or apply much force to cut to make the pipe deformed. The drawback of the conventional pipe cutting device using the fixed elastic force is inability to adjust the moving path of the cutter.

In order to achieve the objective, the present invention provides a pipe cutting device capable of adjusting a moving path of a cutter, and the pipe cutting device includes a pipe cutting structure. The pipe cutting structure includes a rotating axis, a first C-shaped half-body, a second C-shaped half-body, the cutter, at least two wheels, an automatic cutter feeding mechanism, and at least one pair of arc-shaped plate adjustment screws, and a rotating axis. The first C-shaped half-body includes at least one first screw hole. The second C-shaped half-body is disposed coaxially with the rotating axis, and includes two side ends and a peripheral portion. One of the two side ends is combined with the first C-shaped half-body, and the peripheral portion has at least one second screw hole. The cutter includes a cutter shaft and a force transfer portion. The cutter shaft rotatably connects the cutter between the first C-shaped half-body and the second C-shaped half-body, and is in parallel with the rotating axis, and the force transfer portion is coaxially connected to the cutter shaft. The at least two wheels are disposed between the first C-shaped half-body and the second C-shaped half-body. The at least two wheels and the cutter are respectively rotatable. The automatic cutter feeding mechanism corresponds to the cutter, is disposed between the first C-shaped half-body and the second C-shaped half-body, and includes a pair of arc-shaped guiding plates and an elastic force generating device. The pair of arc-shaped guiding plates are disposed on the first C-shaped half-body and the second C-shaped half-body respectively, and configured to adjust the moving path of the cutter shaft, and the elastic force generating device is configured to apply a pressing force on the force transfer portion. The at least one pair of arc-shaped plate adjustment screws correspond to the pair of arc-shaped guiding plates, and are screwed into the at least one first screw hole and the at least one second screw hole respectively. The at least one pair of arc-shaped plate adjustment screws are configured to selectively screw tightly to push the pair of arc-shaped guiding plates, and screw loosely to loosen the pair of arc-shaped guiding plates, so as to adjust the moving path of the cutter shaft along the pair of arc-shaped guiding plates.

DETAILED DESCRIPTION OF THE PREFERRED EMBODIMENTS

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art.

The present invention provides a pipe cutting device capable of adjusting a moving path of a cutter. Please refer to FIGS. 1A and 2A, which show a first embodiment of a pipe cutting device of the present invention. The first embodiment of the pipe cutting device includes a pipe cutting structure 20.

Figure 1A:
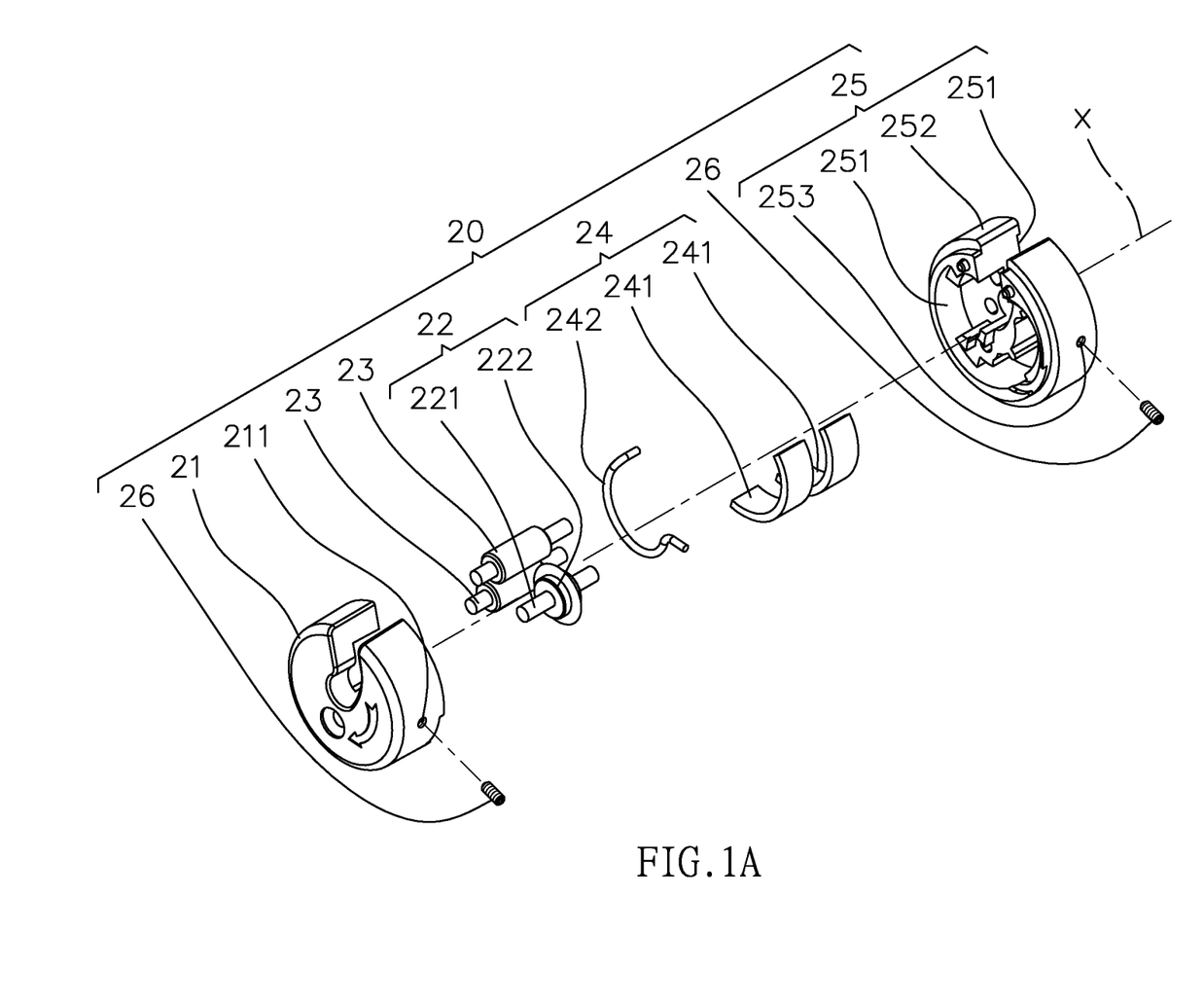
FIG. 1A is an exploded view of a first embodiment of a pipe cutting device of the present invention.
Figure 2A:
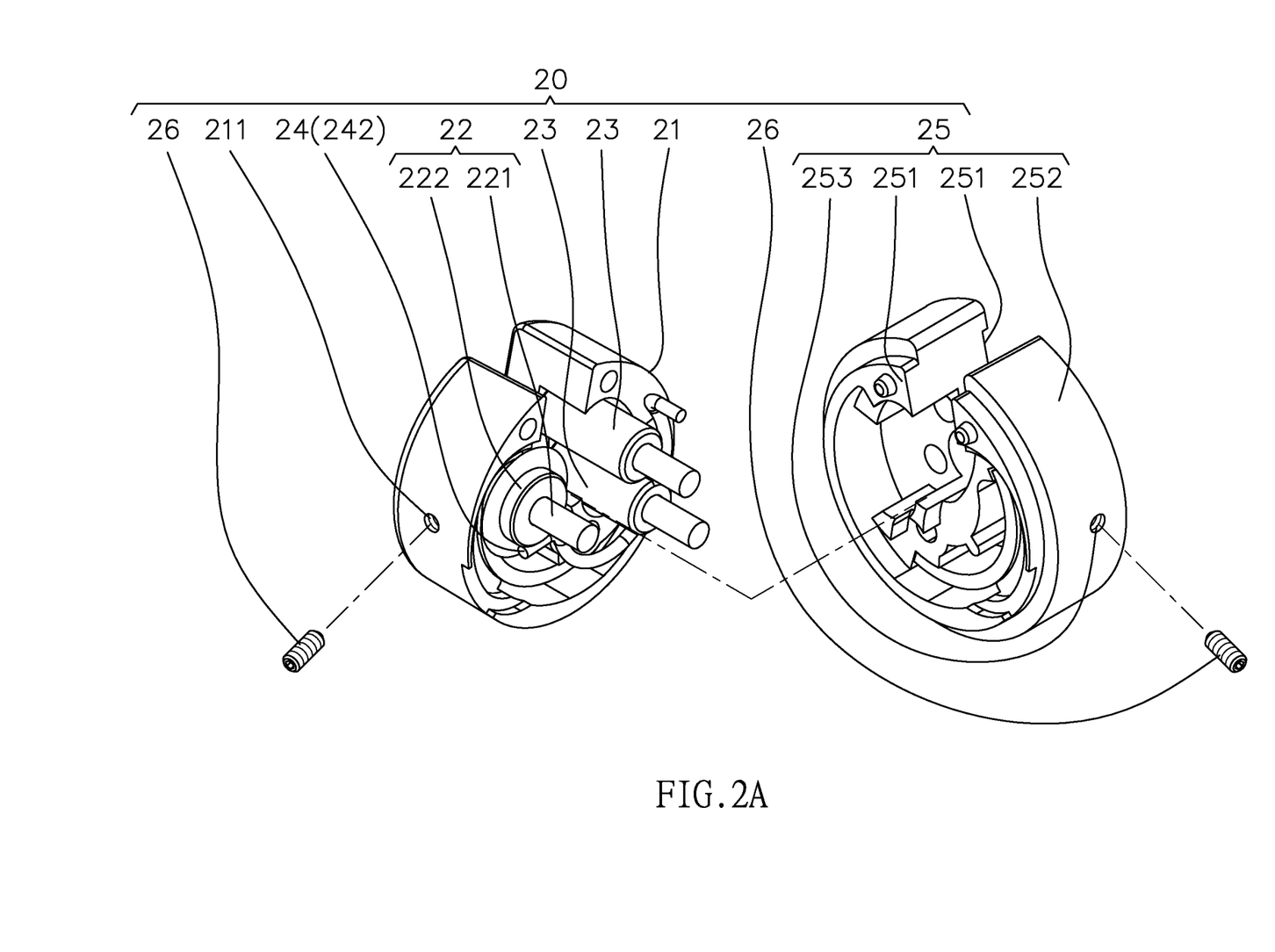
FIG. 2A is a schematic view of a corresponding relationship between partial structures of FIG. 1A.
Figure 2B:
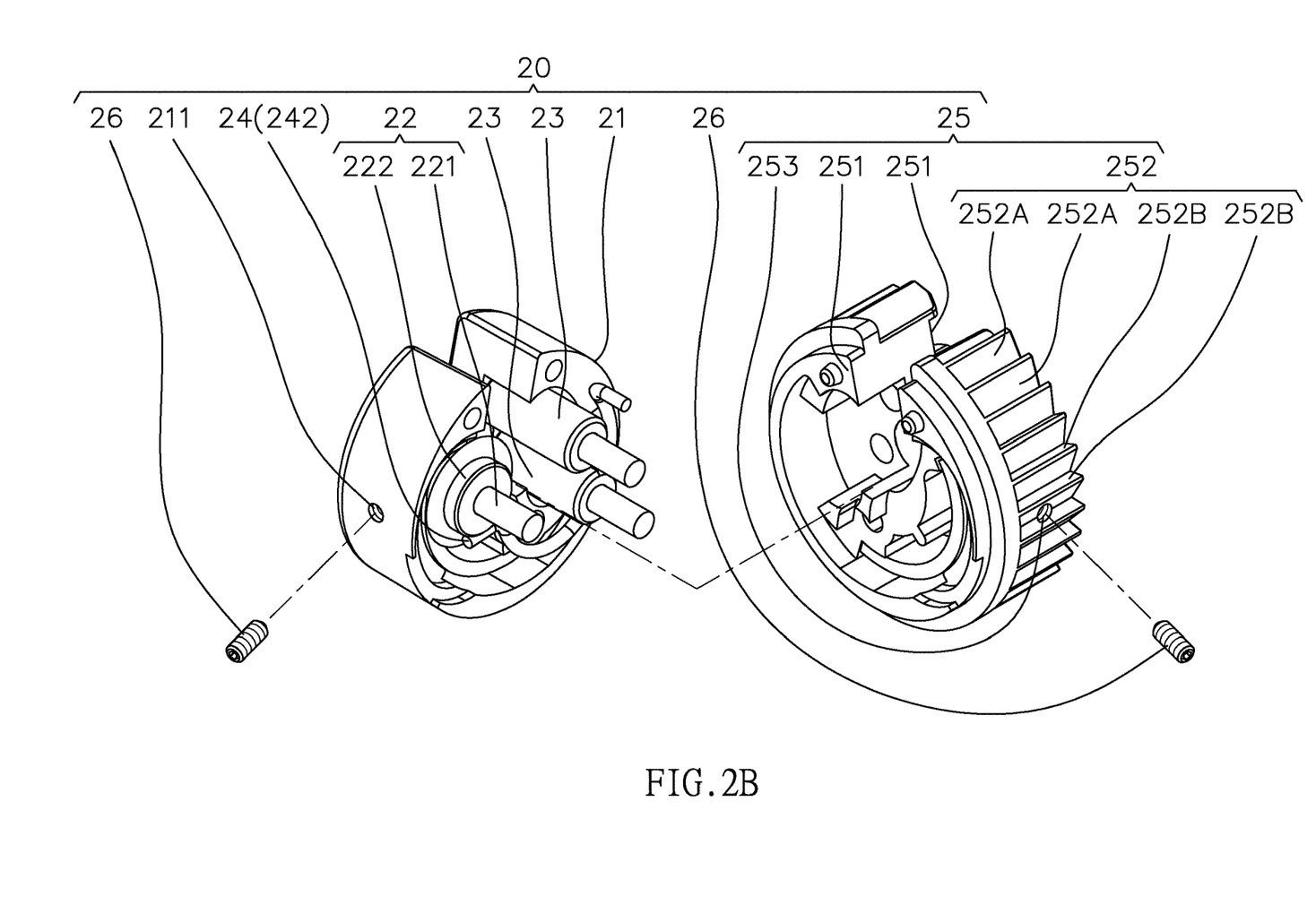
FIG. 2B is a schematic view of a corresponding relationship between partial structures of FIG. 1A.

The pipe cutting structure 20 comprises a first C-shaped half-body 21, a cutter 22, at least two wheels 23, an automatic cutter feeding mechanism 24, a second C-shaped half-body 25, at least one pair of arc-shaped plate adjustment screws 26, and a rotating axis X. The first C-shaped half-body 21 has at least one first screw hole 211. The cutter 22 has a cutter shaft 221 and a force transfer portion 222. The cutter shaft 221 rotatably connects the cutter 22 between the first C-shaped half-body 21 and the second C-shaped half-body 25. The cutter shaft 221 is disposed in parallel with the rotating axis X. The force transfer portion 222 is coaxially connected to the cutter shaft 221. The at least two wheels 23 correspond in position to the cutter 22, and are disposed between the first C-shaped half-body 21 and the second C-shaped half-body 25. The at least two wheels 23 and the cutter 22 are respectively rotatable. The automatic cutter feeding mechanism 24 corresponds in position to the cutter 22, and is disposed between the first C-shaped half-body 21 and the second C-shaped half-body 25. The automatic cutter feeding mechanism 24 includes a pair of arc-shaped guiding plates 241 and an elastic force generating device 242. The arc-shaped guiding plates 241 are disposed on the first C-shaped half-body 21 and the second C-shaped half-body 25 respectively, and configured to adjust a moving path of the cutter shaft 221. The elastic force generating device 242 is configured to apply a pressing force to the force transfer portion 222. The second C-shaped half-body 25 is disposed coaxially with the rotating axis X, and has two side ends 251 and a peripheral portion 252. The first C-shaped half-body 21 is combined with one of the side ends 251. The peripheral portion 252 has at least one second screw hole 253.

Figure 4A:
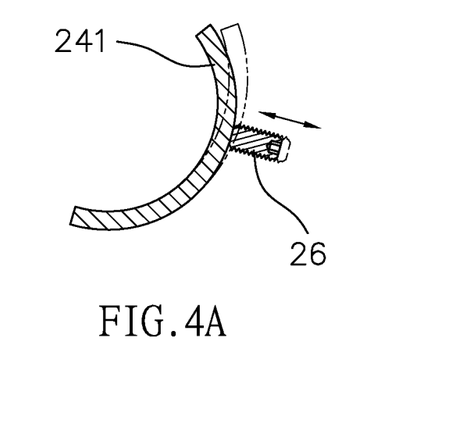
FIG. 4A is a schematic view of an operation of an arc-shaped plate adjustment screw relative to an arc-shaped guiding plate of FIG. 3A.
Figure 4B:
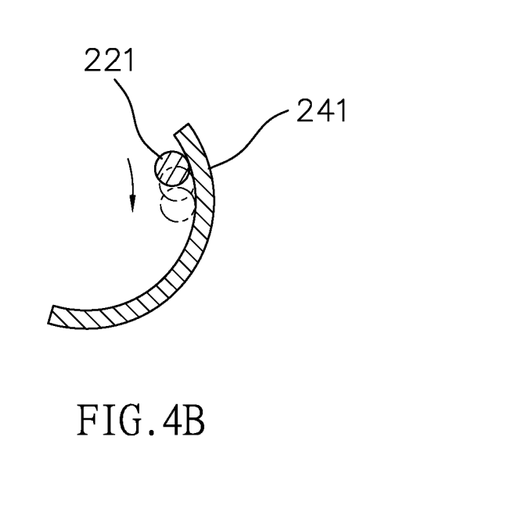
FIG. 4B is a schematic view of an operation of a cutter shaft relative to the arc-shaped guiding plate of FIG. 3A.
Figure 5A:
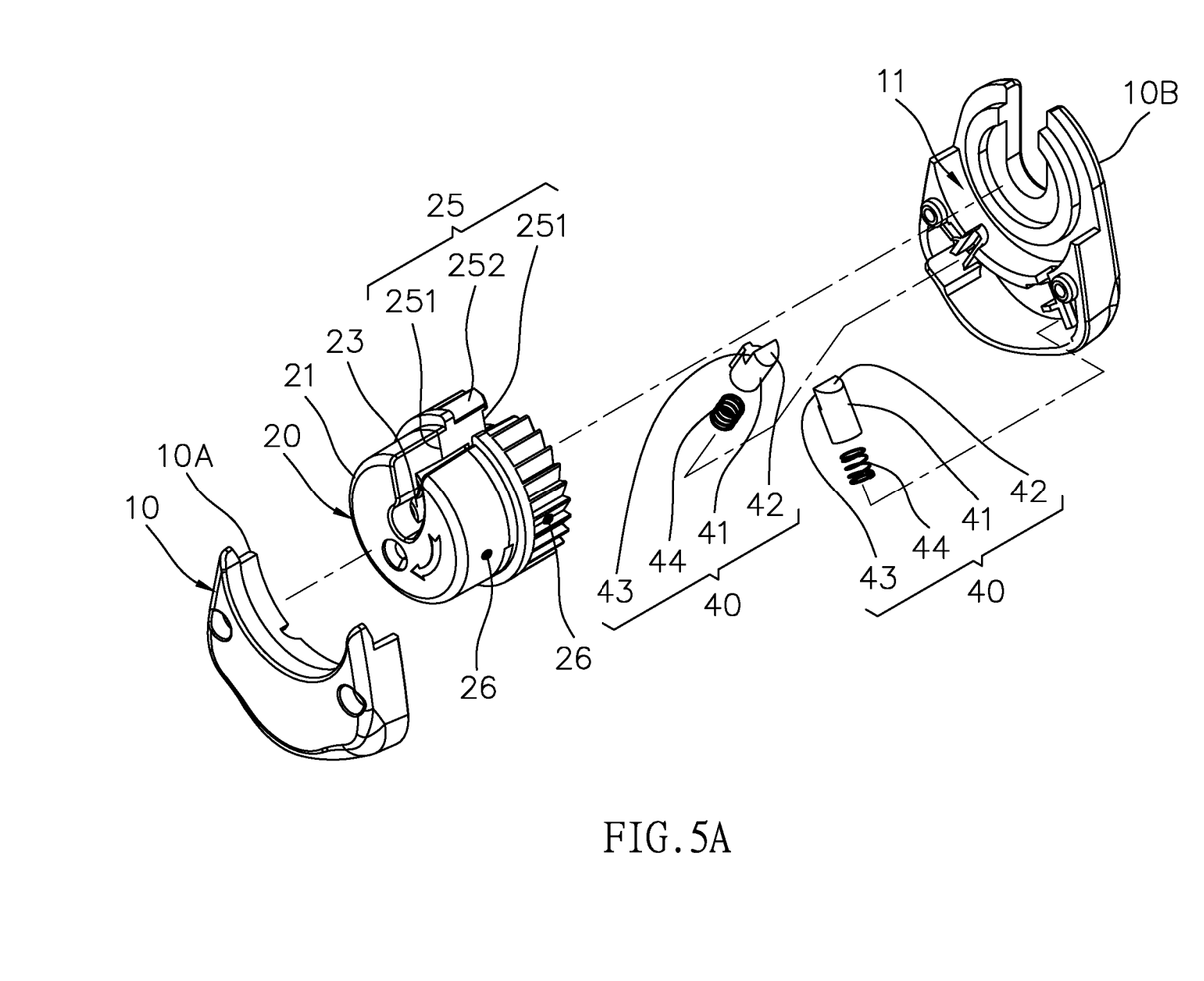
FIG. 5A is a schematic view of an assembly of a part of FIG. 1B.
Figure 5B:
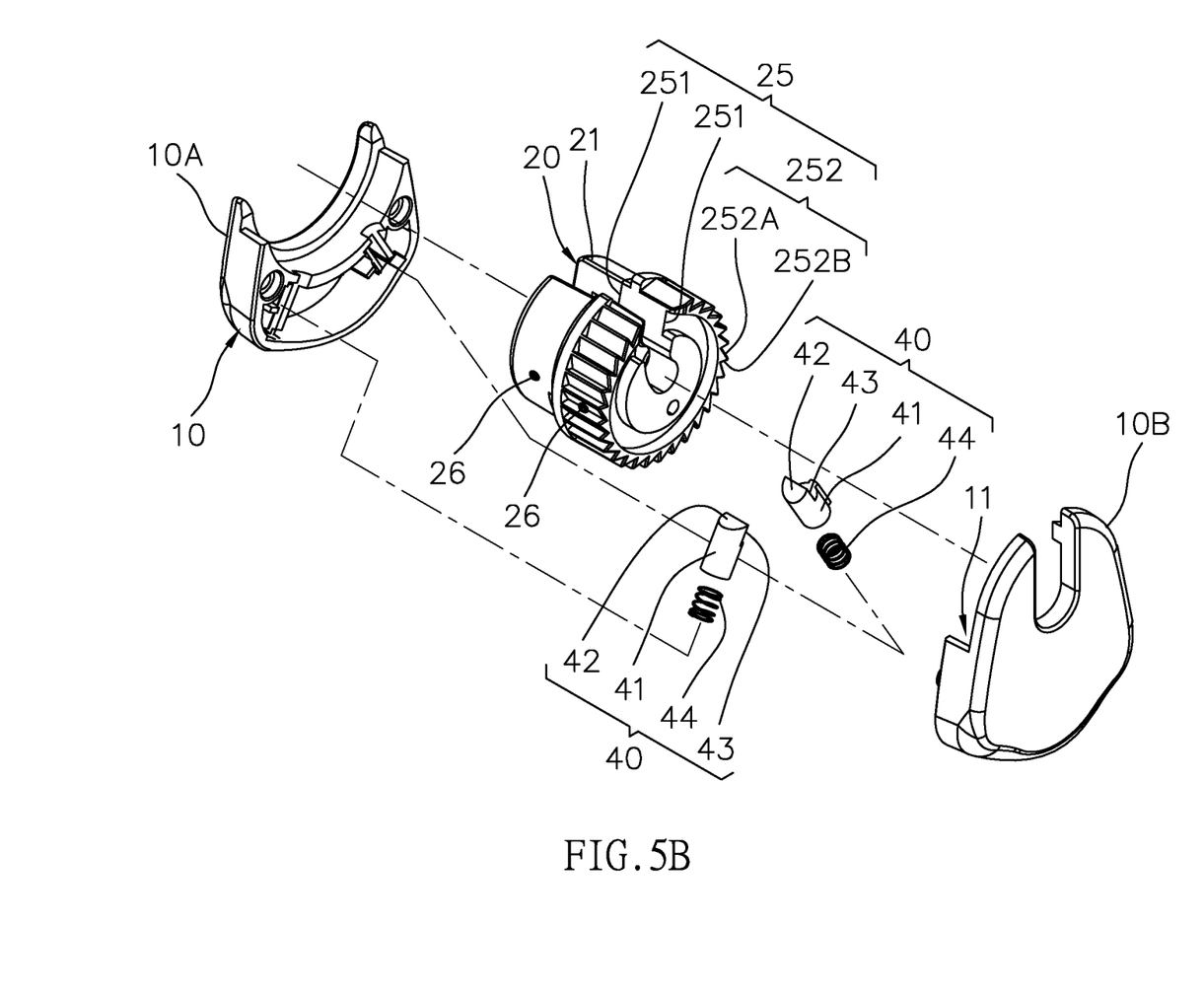
FIG. 5B is a schematic view of FIG. 5A, when viewed from another angle.

The at least one pair of arc-shaped plate adjustment screws 26 correspond in position to the pair of arc-shaped guiding plates 241, and are screwed into the first screw hole 211 and the second screw hole 253 respectively. When the arc-shaped plate adjustment screws 26 are screwed tightly, the arc-shaped guiding plates 241 are pushed, as shown in FIG. 4A. Also, when the arc-shaped plate adjustment screws 26 are screwed loosely, the arc-shaped guiding plates 241 are loosened, so as to adjust a moving path of the cutter shaft 221 along the arc-shaped guiding plates 241, as shown in FIG. 4B.

Figure 3A:
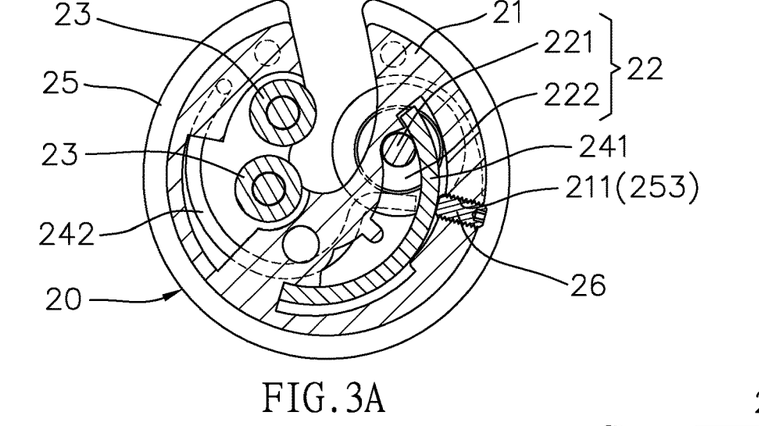
FIG. 3A is a schematic view of a first corresponding relationship of partial structures of a pipe cutting device of the present invention.
Figure 3B:
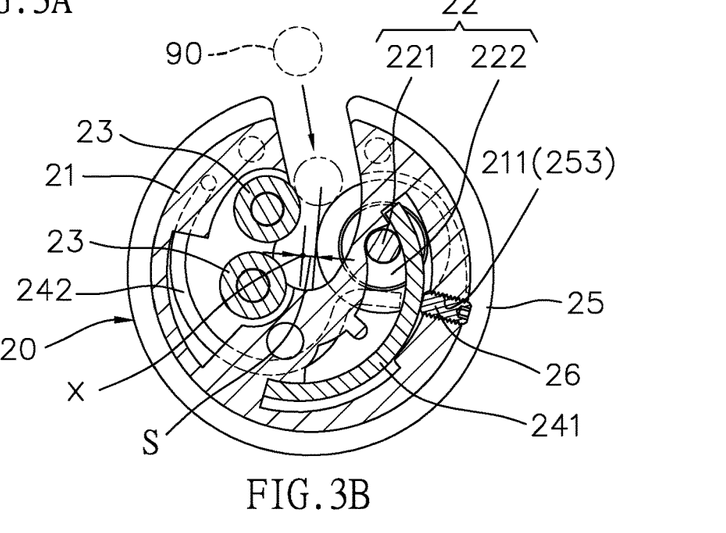
FIG. 3B is a schematic view of a first operation of partial structures of FIG. 3A.
Figure 3C:
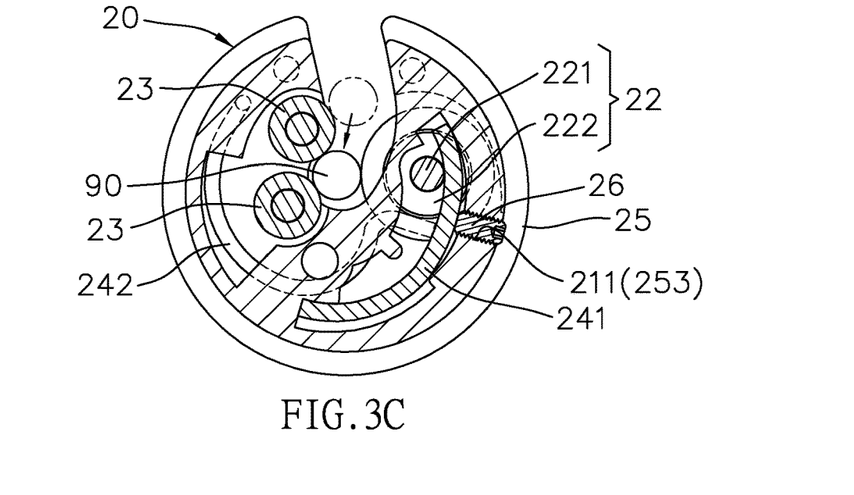
FIG. 3C is a schematic view of a second operation of the partial structures of FIG. 3A.
Figure 3D:
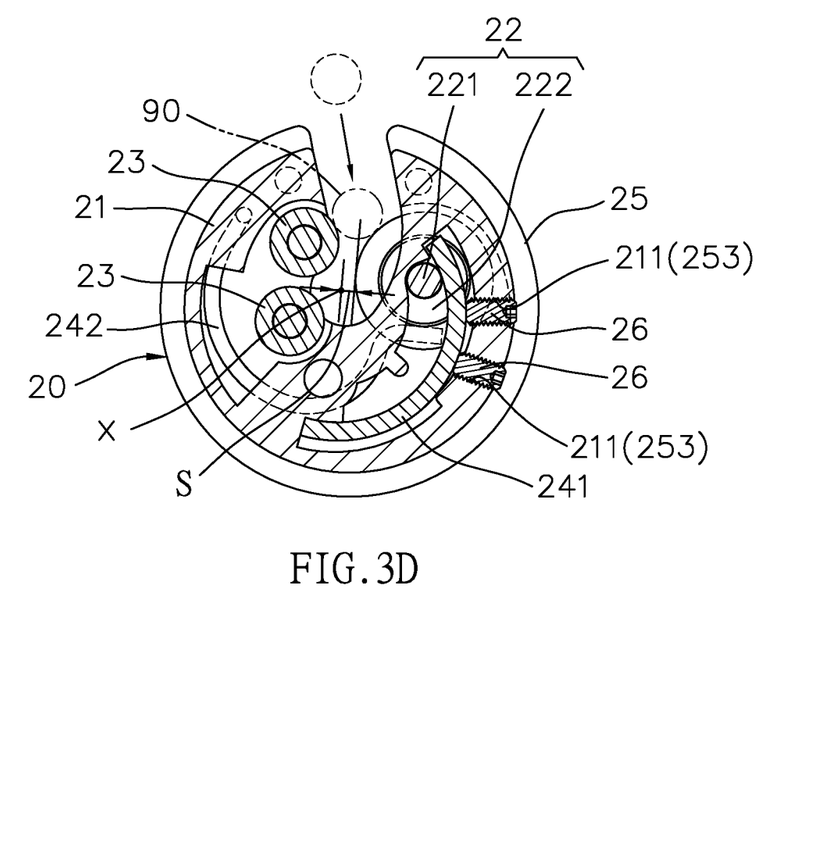
FIG. 3D is a schematic view of a second corresponding relationship of partial structures of a pipe cutting device of the present invention.

In practical application, as shown in FIG. 3D, the first C-shaped half-body 21 can include multiple first screw holes 211.

The peripheral portion 252 can include multiple second screw holes 253.

The multiple arc-shaped plate adjustment screws 26 can be provided to correspond to the multiple first screw holes 211 and the multiple second screw holes 253.

Therefore, when the cutter shaft 221 is moved along the arc-shaped guiding plates 241, as shown in FIG. 4B, the moving path of the cutter shaft 221 can be adjusted correspondingly to different positions of the arc-shaped guiding plates 241.

Please refer to FIGS. 1B, 1C, 1D, 2B, 3A, 3B, 3C, 3D, 4A, 4B, 5A and 5B. The difference between the second embodiment and the first embodiment of the present invention is that the second embodiment of the pipe cutting device includes a C-shaped-opening housing structure 10 and two unidirectional restraining structures 40.

Figure 1B:
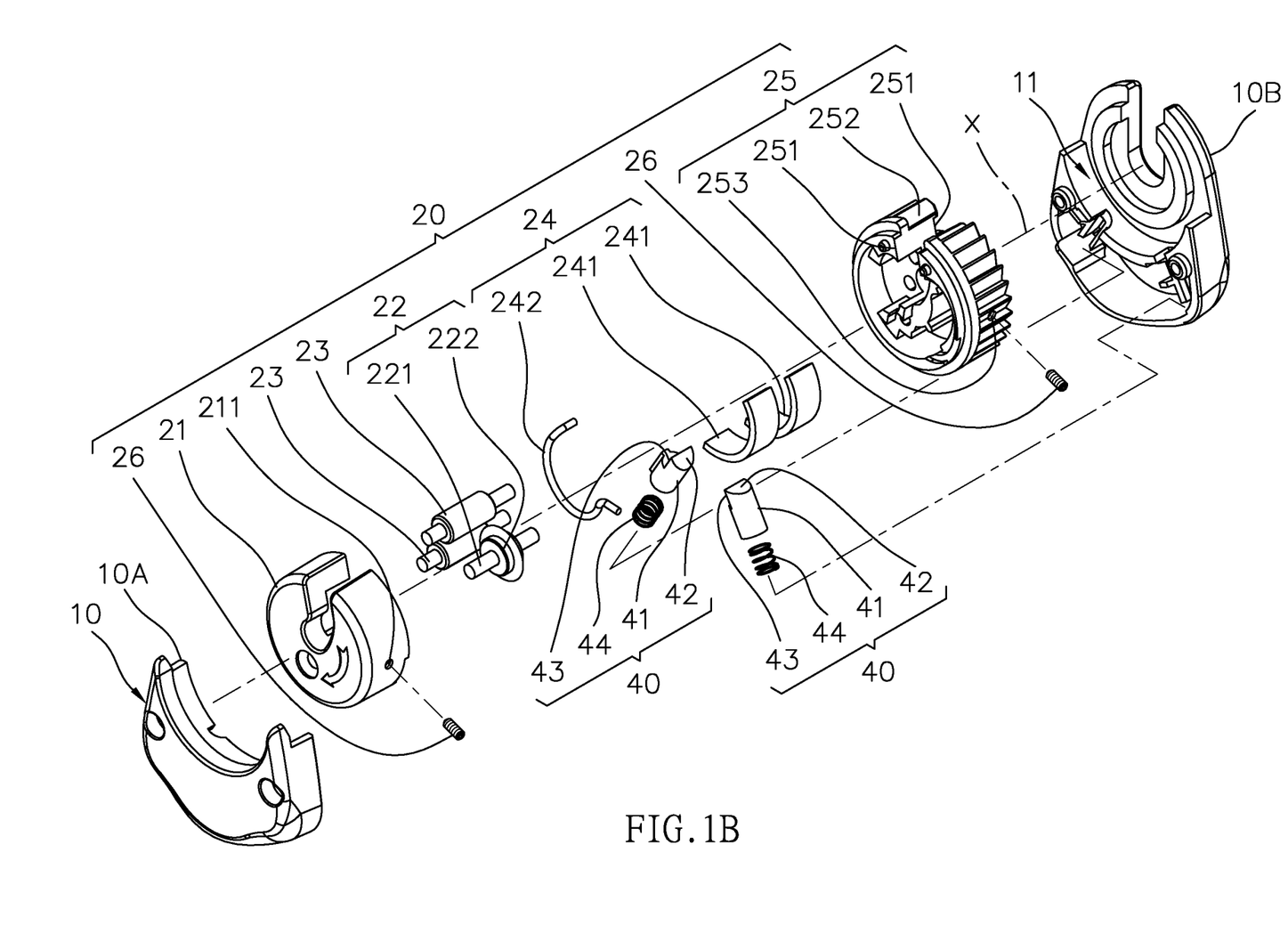
FIG. 1B is an exploded view of a second embodiment of a pipe cutting device of the present invention.
Figure 1C:
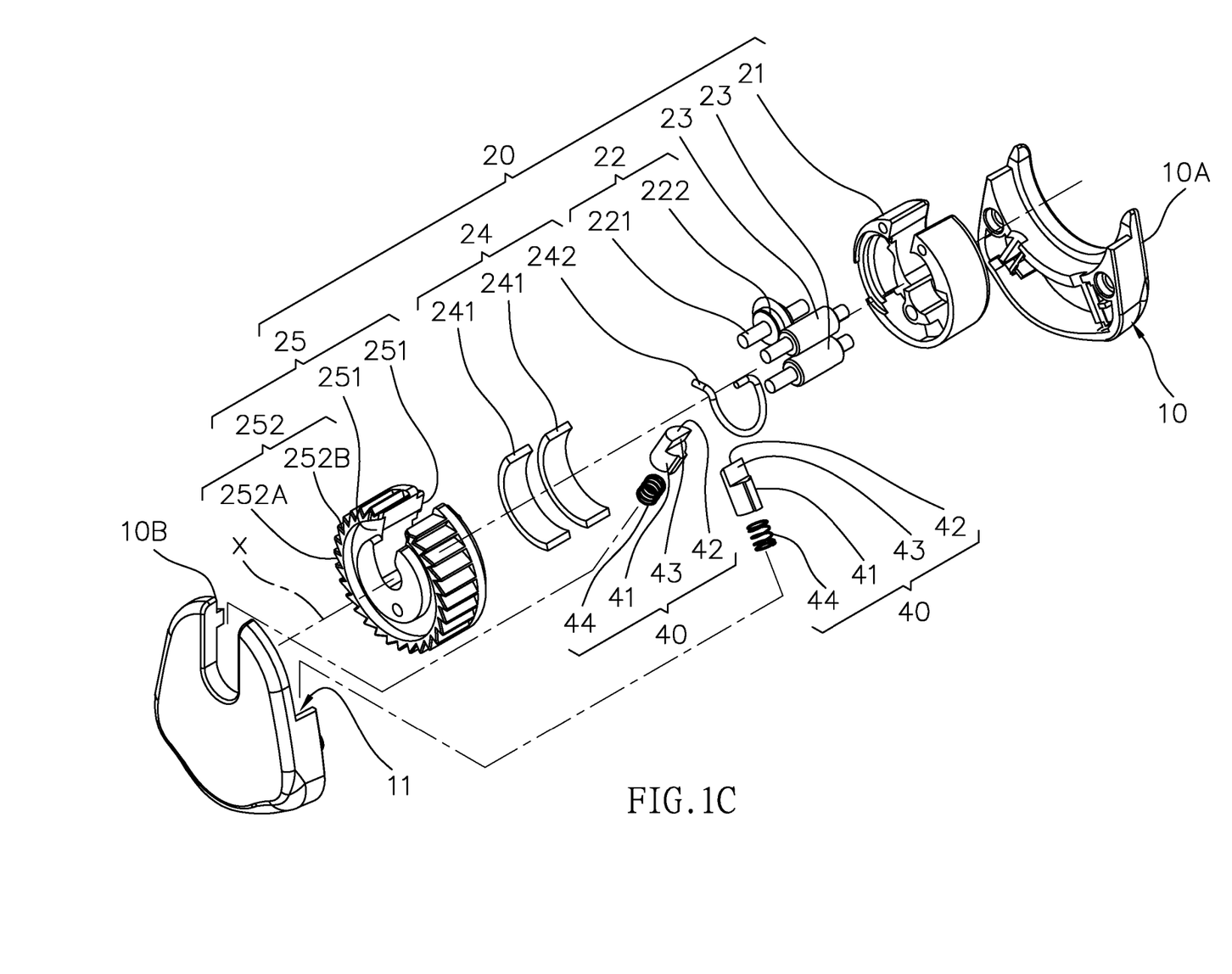
FIG. 1C is a schematic view of the second embodiment of the present invention, when viewed from another angle.
Figure 1D:
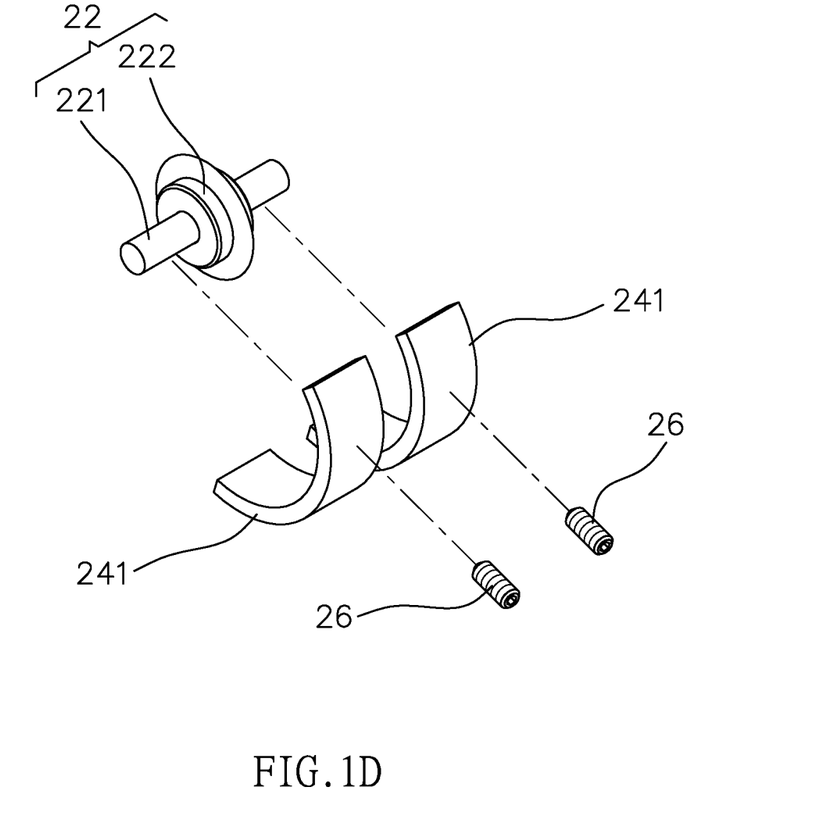
FIG. 1D is a schematic view of a corresponding relationship between partial structures of FIG. 1B.

The C-shaped-opening housing structure 10 includes an accommodating space 11. The pipe cutting structure 20 is disposed in the accommodating space 11, and rotatable relative to the C-shaped-opening housing structure 10 and along the rotating axis X.

The peripheral portion 252 engages with the two unidirectional restraining structures 40, and comprises a plurality of inclined tooth flanks 252A and a plurality of perpendicular stop surfaces 252B. The plurality of inclined tooth flanks 252A and the plurality of perpendicular stop surface 252B are sequentially distributed in an interlaced arrangement on the peripheral portion 252. The at least one second screw hole 253 is inserted into at least one of the inclined tooth flanks 252A and the perpendicular stop surfaces 252B.

Figure 6A:
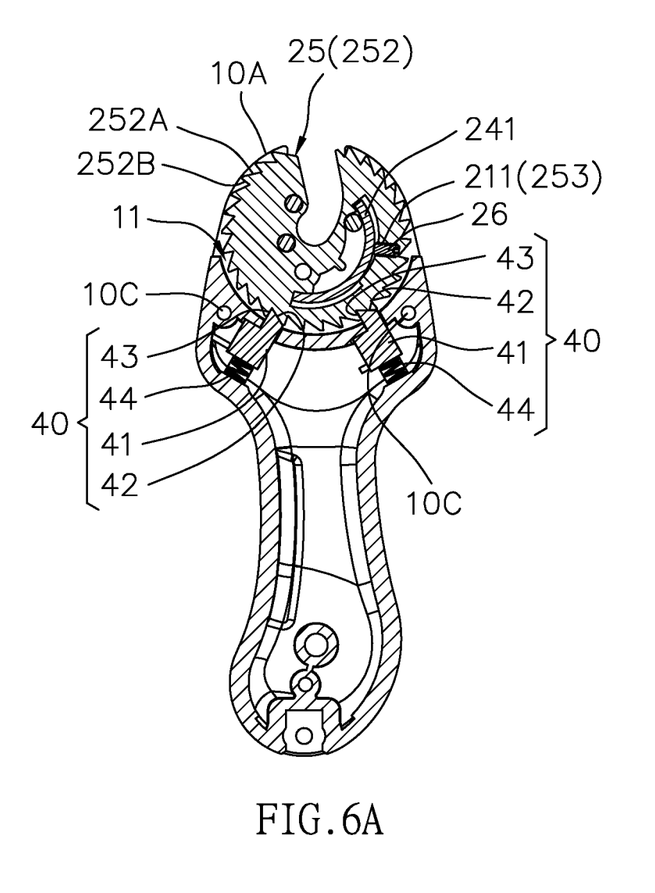
FIG. 6A is a schematic view of a third embodiment of a pipe cutting device of the present invention.
Figure 6B:
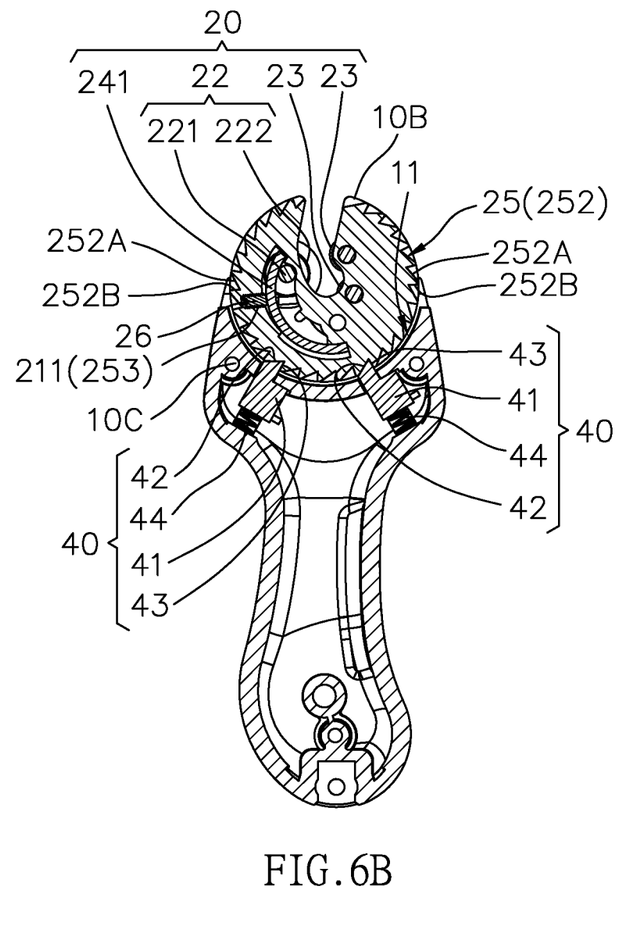
FIG. 6B is a schematic view of FIG. 6A, when viewed from another angle.

Each of the two unidirectional restraining structures 40 comprises a sliding block 41, an inclined guide surface 42, an engagement surface 43 and a pushing force generating portion 44. The inclined guide surface 42 is disposed on the sliding block 41, and corresponds in position to a predetermined inclined tooth flank 252A, as shown in FIGS. 6A and 6B. The engagement surface 43 is disposed on the sliding block 41 and configured to abut against a predetermined perpendicular stop surface 252B, so as to restrain the C-shaped-opening housing structure 10 to only unidirectionally rotate relative to the pipe cutting structure 20.

In practical application, the C-shaped-opening housing structure 10 comprises two C-shaped-opening half housing parts 10A and 10B matching with each other, and a plurality of fastening devices 10C for locking the two C-shaped-opening half housing parts 10A and 10B together, as shown in FIGS. 6A and 6B. In another embodiment, the above structure can be modified to an equivalent structure including a combination of a large C-shaped-opening half housing part and a small C-shaped-opening half housing part, or a combination of multiple C-shaped-opening half housing parts. The accommodating space 11 is disposed between the C-shaped-opening half housing parts 10A and 10B.

In practical application, the amount of the unidirectional restraining structures 40 can be two or more, such as three.

Figure 7:
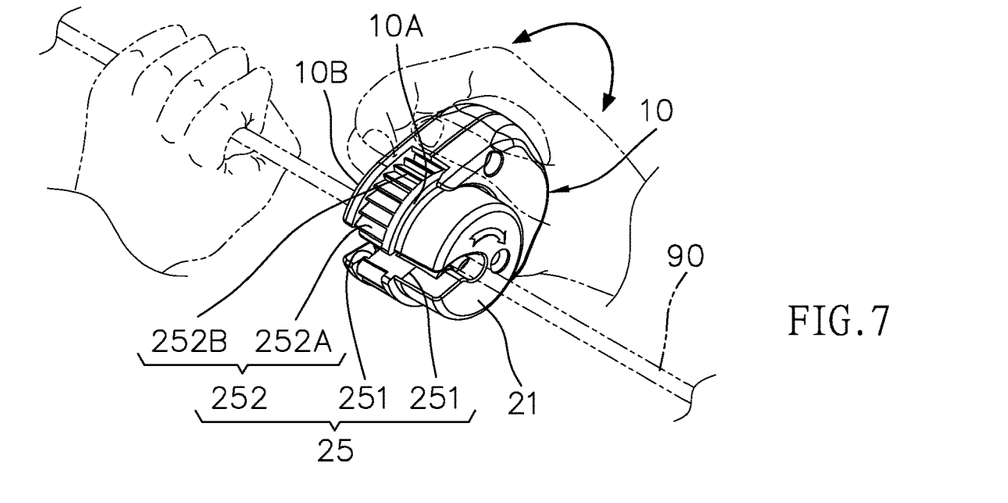
FIG. 7 is a schematic view of a first operation of a pipe cutting device of the present invention.

When the first and second embodiments of the present invention are used, an appreciate pipe cutting device of the present invention can be selected and assembled according to an outer diameter of the predetermined pipe 90 (to-be-cut), as shown in FIGS. 3B and 7; or a completely-assembled pipe cutting device of the present invention can be directly selected to use. Next, a user can grip the C-shaped-opening housing structure 10 of the present invention by a single hand, and fasten the pipe 90 by the other hand, and then reciprocate and rotate the pipe 90 by a predetermined angle. During the reciprocation process, the cutter 22 contacts the pipe 90 (as shown in FIG. 3C) and rotates relative to the pipe 90, and the elastic force generating device 242 applies a pressing force to the force transfer portion 222, so as to force the cutter shaft 221 to rotate and move relative to the pair of arc-shaped guiding plates 241, as shown in FIG. 4B. Thus, it can perform the automatic cutter feeding operation. During the automatic cutter feeding operation, an operating distance S between the cutter shaft 221 and the rotating axis X is gradually reduced, so that the cutter 22 can be automatically fed toward a location between the two wheels 23, that is, in the direction toward the pipe 90. It should be noted that the operating distance reduction process is not shown in figures.

As a result, the user can grip the C-shaped-opening housing structure 10, which has an approximately hand-holdable size, very easily to reciprocate and rotate the pipe 90 by the predetermined angle for multiple times or dozens of times, so as to gradually cut the pipe 90 off. It is very convenient for the user to operate the pipe cutting device of the present invention without changing hand.

Figure 8:
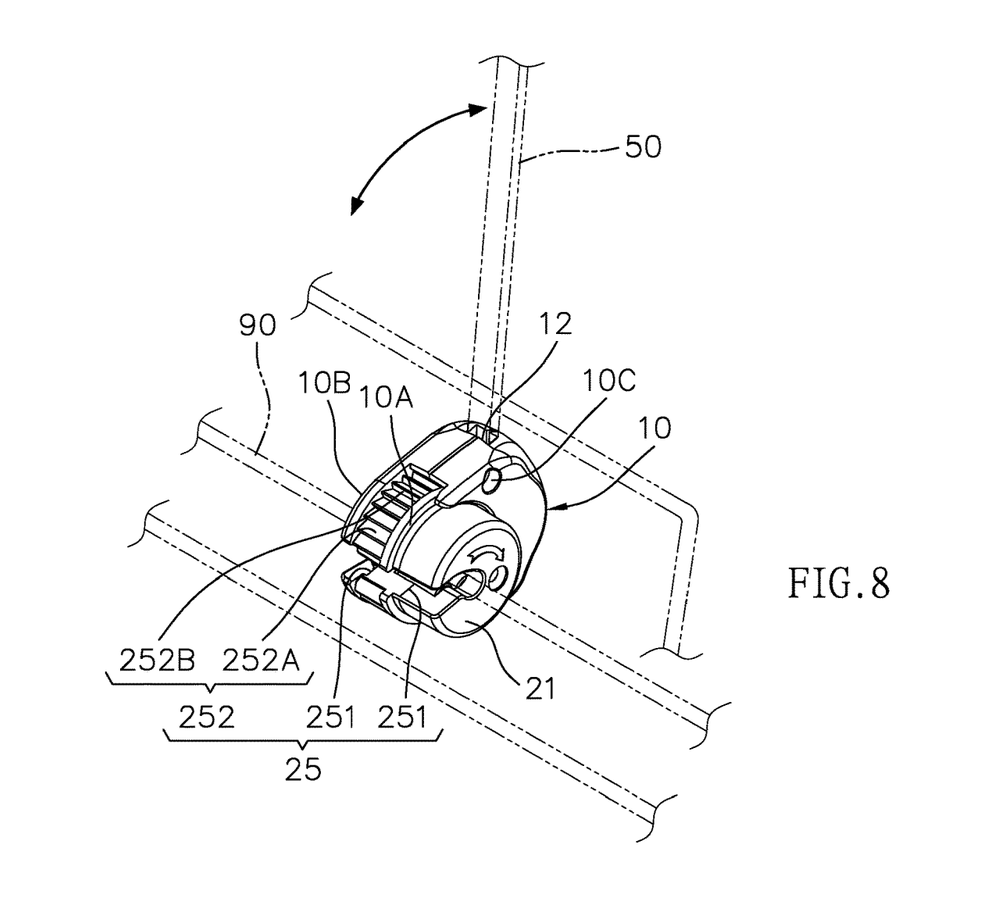
FIG. 8 is a schematic view of a second operation of a pipe cutting device of the present invention.

Furthermore, in an embodiment, the pipe cutting device of the present invention can comprise an extended force applying handle 50 that is connected to the C-shaped-opening housing structure 10, as shown in FIG. 8. The type and connection manner of the extended force applying handle 50 can be modified as well.

As a result, the key feature of the present invention is that the at least one pair of the arc-shaped plate adjustment screws 26 corresponds in position to the pair of arc-shaped guiding plates 241, and are screwed into the at least one first screw hole 211 and the at least one second screw hole 253 respectively. When the arc-shaped plate adjustment screws 26 are screwed tightly, the arc-shaped guiding plates 241 are pushed, as shown in FIG. 4A. When the arc-shaped plate adjustment screws 26 are screwed loosely, the arc-shaped guiding plates 241 are loosened, so as to adjust the moving path of the cutter shaft 221 along the arc-shaped guiding plates 241, as shown in FIG. 4B, thereby indirectly achieving the effect of adjusting the feeding amount (or called feeding distance) of the cutter 22 for the pipe 90.

According to above-mentioned contents, the pipe cutting device of the present invention has following advantages and effects.

First, the pipe cutting device of the present invention can adjust the moving path of the cutter. When the arc-shaped plate adjustment screws are screwed tightly, the arc-shaped guiding plates are pushed. When the arc-shaped plate adjustment screws are screwed loosely, the arc-shaped guiding plates are loosened, so as to adjust the moving path of the cutter shaft along the arc-shaped guiding plates.

Secondly, the pipe cutting device of the present invention can be fine-tuned to cut the pipe with slightly different outer diameter. For the pipe with different outer diameter (possible slightly different), the pipe cutting device of the present invention can use the same pipe cutting structure and adjust or fine tune the moving path of the cutter, to cut the pipe with slightly different outer diameter. As a result, the pipe cutting device of the present invention can be fine-tuned to cut the pipe with slightly different outer diameter.

Thirdly, the pipe cutting device of the present invention can adjust the pressing force of the cutter performing the automatic feeding operation. When the arc-shaped plate adjustment screws are locked more tightly, the arc-shaped guiding plates are pushed and pressed more, so that the arc-shaped guiding plates push the cutter shaft more to increase the pressing force of the cutter performing the automatic feeding operation on the pipe, thereby cutting the pipe having the same outer diameter but made by different material. Therefore, the pipe cutting device of the present invention can adjust the pressing force of the cutter performing the feeding operation.

The present invention disclosed herein has been described by means of specific embodiments. However, numerous modifications, variations and enhancements can be made thereto by those skilled in the art without departing from the scope of the disclosure set forth in the claims.

What is claimed is:

1. A pipe cutting device capable of adjusting a moving path of a cutter comprising:
    a pipe cutting structure comprising:
        a rotating axis;
        a first C-shaped half-body comprising at least one first screw hole;
        a second C-shaped half-body disposed coaxially with the rotating axis, and comprising two side ends and a peripheral portion, wherein one of the two side ends is combined with the first C-shaped half-body, and the peripheral portion has at least one second screw hole;
        the cutter comprising a cutter shaft and a force transfer portion, wherein the cutter shaft rotatably connects the cutter between the first C-shaped half-body and the second C-shaped half-body, and is in parallel with the rotating axis, and the force transfer portion is coaxially connected to the cutter shaft;
        at least two wheels being disposed between the first C-shaped half-body and the second C-shaped half-body; the at least two wheels and the cutter being respectively rotatable;
        an automatic cutter feeding mechanism disposed between the first C-shaped half-body and the second C-shaped half-body, and comprising a pair of arc-shaped guiding plates and an elastic force generating device, wherein the pair of arc-shaped guiding plates are disposed on the first C-shaped half-body and the second C-shaped half-body respectively, and configured to adjust the moving path of the cutter shaft, and the elastic force generating device is configured to apply a pressing force on the force transfer portion; and
        at least one pair of arc-shaped plate adjustment screws aligned with the pair of arc-shaped guiding plates, and screwed into the at least one first screw hole and the at least one second screw hole respectively, wherein the at least one pair of arc-shaped plate adjustment screws are configured to selectively screw tightly to push the pair of arc-shaped guiding plates, and screw loosely to loosen the pair of arc-shaped guiding plates, so as to adjust the moving path of the cutter shaft along the pair of arc-shaped guiding plates.

2. The pipe cutting device capable of adjusting a moving path of a cutter according to claim 1, further comprising:
a C-shaped-opening housing structure having an accommodating space, wherein the pipe cutting structure is disposed in the accommodating space, and rotatable relative to the C-shaped-opening housing structure and along the rotating axis; and
two unidirectional restraining structures, wherein each of the two unidirectional restraining structures comprises a sliding block, an inclined guide surface, an engagement surface and a pushing force generating portion, the peripheral portion engages with the two unidirectional restraining structures and has a plurality of inclined tooth flanks and a plurality of perpendicular stop surfaces distributed thereon in an interlaced arrangement, and the at least one second screw hole is cut through at least one of the plurality of inclined tooth flanks and the plurality of perpendicular stop surfaces;
wherein the inclined guide surface is formed on the sliding block and corresponds in position to a predetermined one of the plurality of inclined tooth flanks, and the engagement surface is formed on the sliding block and configured to abut against a predetermined one of the plurality of perpendicular stop surfaces, so as to restrain the pipe cutting structure to unidirectionally rotate relative to the C-shaped-opening housing structure.

3. The pipe cutting device capable of adjusting a moving path of a cutter according to claim 2, wherein the C-shaped-opening housing structure comprises two C-shaped-opening half housing parts matching with each other, and a plurality of fastening devices locking the two C-shaped-opening half housing parts together;
wherein the accommodating space is formed between the two C-shaped-opening half housing parts.

4. The pipe cutting device capable of adjusting a moving path of a cutter according to claim 2, further comprising:
an extended force applying handle connected to the C-shaped-opening housing structure.

\* \* \* \* \*